US007970892B2

(12) United States Patent
Sedukhin et al.

(10) Patent No.: US 7,970,892 B2
(45) Date of Patent: Jun. 28, 2011

(54) TUNING AND OPTIMIZING DISTRIBUTED SYSTEMS WITH DECLARATIVE MODELS

(75) Inventors: Igor Sedukhin, Issaquah, WA (US);
Daniel Eshner, Issaquah, WA (US);
Amol S. Kulkarni, Bothell, WA (US);
Prasad S. Panditharadhya, Sammamish, WA (US); Mariusz G. Borsa, Redmond, WA (US); Gilles C. J. A Zunino, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 11/771,827

(22) Filed: Jun. 29, 2007

(65) Prior Publication Data

US 2009/0006063 A1    Jan. 1, 2009

(51) Int. Cl.
*G06F 15/173* (2006.01)
*G06F 15/177* (2006.01)

(52) U.S. Cl. .......................... 709/224; 709/220; 709/221

(58) Field of Classification Search .................. 709/224, 709/277, 203, 227, 220, 221; 707/100; 717/174; 715/733, 763

See application file for complete search history.

(56) References Cited

U.S. PATENT DOCUMENTS

| | | | |
|---|---|---|---|
| 4,751,635 A | 6/1988 | Kret | |
| 5,423,003 A * | 6/1995 | Berteau | 370/254 |
| 5,602,991 A * | 2/1997 | Berteau | 709/227 |
| 5,655,081 A | 8/1997 | Bonnell | |
| 5,764,241 A | 6/1998 | Elliott et al. | |
| 5,893,083 A | 4/1999 | Eshghi et al. | |
| 5,937,388 A | 8/1999 | Davis et al. | |
| 5,958,010 A | 9/1999 | Agarwal | |
| 6,026,404 A * | 2/2000 | Adunuthula et al. | 1/1 |
| 6,055,363 A | 4/2000 | Beals et al. | |
| 6,070,190 A | 5/2000 | Reps | |
| 6,167,538 A * | 12/2000 | Neufeld et al. | 714/47 |
| 6,225,995 B1 * | 5/2001 | Jacobs et al. | 715/738 |
| 6,247,056 B1 * | 6/2001 | Chou et al. | 709/229 |

(Continued)

FOREIGN PATENT DOCUMENTS

EP    1770510    4/2007

(Continued)

OTHER PUBLICATIONS

U.S. Appl. No. 12/105,083, filed Apr. 17, 2008 (Not Yet Published).

(Continued)

*Primary Examiner* — Firmin Backer
*Assistant Examiner* — Michael A Chambers
(74) *Attorney, Agent, or Firm* — Workman Nydegger (57) ABSTRACT

A system for automatically adjusting operation of a distributed application program includes analytics means having a monitoring component. The monitoring component receives one or more event streams of data corresponding to execution of one or more modules of the distributed application program. The monitoring component joins the received event streams with one or more declarative models to create operational data. A forensics component of the analytics means queries, such as by using data from a declarative model store, the operational data to identify trends or behavior information for the various modules or components of the distributed application program. A planner component then reviews data created by the forensics component to identify any needed changes to the declarative models. The planner component passes any modified declarative models back to the system, so that the distributed application program can operate more efficiently using the changes to the declarative models, as needed.

20 Claims, 3 Drawing Sheets

U.S. PATENT DOCUMENTS

| | | |
|---|---|---|
| 6,279,009 B1 | 8/2001 | Smirnov et al. |
| 6,330,717 B1 | 12/2001 | Raverdy et al. |
| 6,334,114 B1 * | 12/2001 | Jacobs et al. ............... 705/26 |
| 6,336,217 B1 | 1/2002 | D'Anjou et al. |
| 6,477,665 B1 | 11/2002 | Bowman-Amuah |
| 6,640,241 B1 | 10/2003 | Ozzie et al. |
| 6,654,783 B1 | 11/2003 | Hubbard |
| 6,662,205 B1 | 12/2003 | Bereiter |
| 6,697,877 B1 * | 2/2004 | Martin et al. ............... 719/315 |
| 6,710,786 B1 * | 3/2004 | Jacobs et al. ............... 715/744 |
| 6,718,535 B1 | 4/2004 | Underwood |
| 6,801,818 B2 | 10/2004 | Kopcha |
| 6,847,970 B2 | 1/2005 | Keller et al. |
| 6,854,069 B2 | 2/2005 | Kampe |
| 6,886,024 B1 | 4/2005 | Fujita |
| 6,907,395 B1 | 6/2005 | Hunt |
| 6,931,644 B2 | 8/2005 | Riosa |
| 6,934,702 B2 | 8/2005 | Faybishenko |
| 6,941,341 B2 | 9/2005 | Logston et al. |
| 7,051,098 B2 * | 5/2006 | Masters et al. ............... 709/224 |
| 7,055,143 B2 | 5/2006 | Ringseth et al. |
| 7,065,579 B2 | 6/2006 | Traversat |
| 7,072,807 B2 | 7/2006 | Brown et al. |
| 7,072,934 B2 * | 7/2006 | Helgeson et al. ............... 709/203 |
| 7,079,010 B2 | 7/2006 | Champlin |
| 7,085,837 B2 | 8/2006 | Kimbrel et al. |
| 7,096,258 B2 | 8/2006 | Hunt |
| 7,103,874 B2 | 9/2006 | McCollum |
| 7,130,881 B2 | 10/2006 | Volkov et al. |
| 7,150,015 B2 | 12/2006 | Pace et al. |
| 7,155,380 B2 | 12/2006 | Hunt et al. |
| 7,155,466 B2 | 12/2006 | Rodriguez |
| 7,162,509 B2 | 1/2007 | Brown et al. |
| 7,168,077 B2 | 1/2007 | Kim |
| 7,174,359 B1 | 2/2007 | Hamilton, II et al. |
| 7,178,129 B2 | 2/2007 | Katz |
| 7,200,530 B2 | 4/2007 | Brown |
| 7,219,351 B2 | 5/2007 | Bussler et al. |
| 7,263,689 B1 | 8/2007 | Edwards et al. |
| 7,379,999 B1 * | 5/2008 | Zhou et al. ............... 709/224 |
| 7,512,707 B1 * | 3/2009 | Manapragada et al. ...... 709/240 |
| 2002/0035593 A1 | 3/2002 | Salim et al. |
| 2002/0038217 A1 | 3/2002 | Young |
| 2002/0099818 A1 * | 7/2002 | Russell et al. ............... 709/224 |
| 2002/0111841 A1 | 8/2002 | Leymann |
| 2002/0120917 A1 | 8/2002 | Abrari et al. |
| 2002/0133504 A1 | 9/2002 | Vlahos et al. |
| 2002/0135611 A1 * | 9/2002 | Deosaran et al. ............. 345/738 |
| 2002/0147515 A1 | 10/2002 | Fava et al. |
| 2002/0147962 A1 | 10/2002 | Hatanaka |
| 2002/0198734 A1 | 12/2002 | Greene |
| 2003/0005411 A1 | 1/2003 | Gerken |
| 2003/0061342 A1 | 3/2003 | Abdelhadi |
| 2003/0084156 A1 | 5/2003 | Graupner et al. |
| 2003/0135384 A1 | 7/2003 | Nguyen |
| 2003/0149685 A1 | 8/2003 | Trossman |
| 2003/0195763 A1 | 10/2003 | Gulcu |
| 2004/0034850 A1 | 2/2004 | Burkhardt |
| 2004/0046785 A1 | 3/2004 | Keller |
| 2004/0078461 A1 | 4/2004 | Bendich et al. |
| 2004/0088350 A1 | 5/2004 | Early |
| 2004/0102926 A1 | 5/2004 | Adendorff |
| 2004/0148184 A1 | 7/2004 | Sadiq |
| 2004/0162901 A1 | 8/2004 | Mangipudi et al. |
| 2005/0005200 A1 | 1/2005 | Matena et al. |
| 2005/0011214 A1 | 2/2005 | Schwetfuehrer |
| 2005/0055692 A1 | 3/2005 | Lupini et al. |
| 2005/0071737 A1 | 3/2005 | Adendorff |
| 2005/0074003 A1 | 4/2005 | Ball |
| 2005/0091227 A1 * | 4/2005 | McCollum et al. ............ 707/100 |
| 2005/0120106 A1 | 6/2005 | Albertao |
| 2005/0125212 A1 * | 6/2005 | Hunt et al. ............... 703/21 |
| 2005/0132041 A1 | 6/2005 | Kundu |
| 2005/0137839 A1 | 6/2005 | Mansurov |
| 2005/0155042 A1 | 7/2005 | Kolb et al. |
| 2005/0165906 A1 | 7/2005 | Deo et al. |
| 2005/0188075 A1 | 8/2005 | Dias et al. |
| 2005/0216831 A1 | 9/2005 | Guzik |
| 2005/0268307 A1 | 12/2005 | Gates et al. |
| 2005/0278702 A1 | 12/2005 | Koyfman |
| 2005/0283518 A1 | 12/2005 | Sargent |
| 2006/0010142 A1 | 1/2006 | Kim |
| 2006/0010164 A1 | 1/2006 | Netz |
| 2006/0013252 A1 | 1/2006 | Smith |
| 2006/0036743 A1 | 2/2006 | Deng et al. |
| 2006/0064460 A1 * | 3/2006 | Sugawara et al. ............. 709/203 |
| 2006/0070066 A1 | 3/2006 | Grobman |
| 2006/0070086 A1 | 3/2006 | Wang |
| 2006/0074734 A1 | 4/2006 | Shukla et al. |
| 2006/0123389 A1 | 6/2006 | Kolawa et al. |
| 2006/0123412 A1 * | 6/2006 | Hunt et al. ................ 717/174 |
| 2006/0155738 A1 | 7/2006 | Baldwin |
| 2006/0173906 A1 | 8/2006 | Chu et al. |
| 2006/0206537 A1 | 9/2006 | Chiang |
| 2006/0230314 A1 | 10/2006 | Sanjar et al. |
| 2006/0235859 A1 | 10/2006 | Hardwick et al. |
| 2006/0265231 A1 | 11/2006 | Fusaro et al. |
| 2006/0277323 A1 | 12/2006 | Joublin et al. |
| 2006/0277437 A1 | 12/2006 | Ohtsuka |
| 2006/0294506 A1 | 12/2006 | Dengler et al. |
| 2007/0005283 A1 | 1/2007 | Blouin |
| 2007/0005299 A1 | 1/2007 | Haggerty |
| 2007/0006122 A1 | 1/2007 | Bailey et al. |
| 2007/0016615 A1 | 1/2007 | Mohan et al. |
| 2007/0033088 A1 | 2/2007 | Aigner et al. |
| 2007/0050237 A1 | 3/2007 | Tien |
| 2007/0050483 A1 | 3/2007 | Bauer et al. |
| 2007/0061776 A1 | 3/2007 | Ryan et al. |
| 2007/0067266 A1 | 3/2007 | Lomet |
| 2007/0088724 A1 | 4/2007 | Demiroski |
| 2007/0089117 A1 | 4/2007 | Samson |
| 2007/0094350 A1 | 4/2007 | Moore |
| 2007/0112847 A1 * | 5/2007 | Dublish et al. ............ 707/103 R |
| 2007/0174228 A1 | 7/2007 | Folting |
| 2007/0174815 A1 | 7/2007 | Chrysanthakopoulos et al. |
| 2007/0179823 A1 | 8/2007 | Bhaskaran |
| 2007/0208606 A1 | 9/2007 | MacKay |
| 2007/0220177 A1 | 9/2007 | Kothari |
| 2007/0244904 A1 | 10/2007 | Durski |
| 2007/0277109 A1 * | 11/2007 | Chen et al. ............... 715/733 |
| 2008/0005729 A1 | 1/2008 | Harvey |
| 2008/0010631 A1 | 1/2008 | Harvey et al. |
| 2008/0244423 A1 * | 10/2008 | Jensen-Pistorius et al. .. 715/763 |
| 2009/0187662 A1 * | 7/2009 | Manapragada et al. ...... 709/226 |
| 2009/0265458 A1 * | 10/2009 | Baker et al. ............... 709/224 |
| 2010/0005527 A1 * | 1/2010 | Jeon ............................... 726/22 |

FOREIGN PATENT DOCUMENTS

| | | |
|---|---|---|
| WO | 01024003 | 4/2001 |
| WO | WO 02/27426 A2 | 4/2002 |
| WO | 2007072501 | 6/2007 |

OTHER PUBLICATIONS

U.S. Appl. No. 11/925,079, filed Oct. 26, 2007, Bhaskar.
U.S. Appl. No. 11/925,326, filed Oct. 26, 2007, Christensen.
U.S. Appl. No. 11/925,680, filed Oct. 26, 2007, Sedukhin.
U.S. Appl. No. 11/925,591, filed Oct. 26, 2007, Sedukhin.
U.S. Appl. No. 11/925,067, filed Oct. 26, 2007, Sedukhin.
U.S. Appl. No. 11/925,184, filed Oct. 26, 2007, Voss.
U.S. Appl. No. 11/925,201, filed Oct. 26, 2007, Sedukhin.
U.S. Appl. No. 60/983,117, filed Oct. 26, 2007, Skierkowski.
OSLO>Suite 2006, "OSLO Suite is the leading platform for designing, building and executing adaptive business solutions", http://www.oslo-software.com/en/product.php.
Korb, John T., et al., "Command Execution in a Heterogeneous Environment", 1986 ACM, pp. 68-74.
Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Eidson, Thomas M., "A Component-based Programming Model for Composite, Distributed Applications", Institute for Computer Applications in Science and Engineering Hampton, VA, May 2001, 1 page.

Bauer, Michael A., "Managing Distributed Applications and Systems: An Architectural Experiment", Jan. 31, 1997, 46 pages.

Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.

Alpern, Bowen, et al, "PDS: A Virtual Execution Environment for Software Deployment", 2005, pp. 175-185.

Talcott, Carolyn L., MTCoord 2005 Preliminary Version, "Coordination Models Based on a Formal Model of Distributed Object Reflection", 13 pages.

Leymann, F., et al., "Web Services and Business Process Management", IBM Systems Journal, vol. 41, No. 2, 2002, New Developments in Web Services and E-commerce, 11 pages.

Ivan, A.-A, et al., "Partionable services: A framework for seamlessly adapting distributed applications to heterogeneous environments", High Performance Distributed Computing, 2002. HPDC-11 2002. Proceedings. 11th IEEE International Symposium, 1 page.

Urban, Susan D., et al., "Active Declarative Integration Rules for Developing Distributed Multi-Tiered Applications", 3 pages.

Bischoff, Urs, et al., "Programming the Ubiquitous Network: A Top-Down Approach" System Support for Ubiquitous Computing Workshop (UbiSys'06), Orange County, USA, Sep. 2006, 8 pages.

Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.

U.S. Appl. No. 11/844,177, filed Aug. 23, 2007, Sedhukin.
U.S. Appl. No. 11/740,737, filed Apr. 26, 2007, Sedhukin.
U.S. Appl. No. 11/771,816, filed Jun. 29, 2007, Sedhukin.

Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.

Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.

Milenkovic, Milan, et al., "Towards Internet Distributed Computing", Sep. 26, 2003, http://m.students.umkc.edu/mpshxf/Towards_IDC.pdf.

Dias, M. Bernardine, et al., "A Real-Time Rover Executive Based on Model-Based Reactive Planning" The 7th International Symposium on Artificial Intelligence, Robotics and Automation in Space, May 2003.

Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.

Robinson, William N., "Implementing Rule-based Monitors within a Framework for continuous Requirements Monitoring" Proceedings of the 38th Hawaii International Conference on System Sciences, 2005 IEEE, 10 pages.

Maghraoui, Kaoutar El, et al., "Model Driven Provisionings: Bridging the Gap Between Declarative Object Models and Procedural Provisioning Tools", http://wcl.cs.rpi.edu/papers/middleware06.pdf.

Office Action dated Mar. 2, 2010 cited in U.S. Appl. No. 11/771,816.
Office Action dated Sep. 14, 2009 cited in U.S. Appl. No. 11/740,737.

"Factal:Edge Enlists CMLgroup to Bring Visualization to Business Performance Management Clients", http://extranet.fractaledge.com/News/PressReleases/2006/060829, 2006, 2 pages.

Office Action dated Oct. 1, 2009 cited in U.S. Appl. No. 11/771,816.

Nastel Technologies, Inc., "AutoPilot Business Dashboard Configuration and User's Guide Version 4.4", 2006, AP/DSB 440.001, 82 pages.

TIBCO the Power of Now, "TIBCO BusinessFactor", 2006, 2 pages.
TIBCO, http://www.tibco.com/software/business_activity_monitoring/businessfactor/default.jsp, Copyright 2000-2007, 2 pages.

Office Action dated Mar. 18, 2010 cited in U.S. Appl. No. 11/740,737.
Office Action dated Apr. 13, 2010 cited in U.S. Appl. No. 11/925,326.
U.S. Appl. No. 11/925,326, filed Jul. 22, 2010, Notice of Allowance.
U.S. Appl. No. 11/925,079, filed Sep. 1, 2010, Office Action.
U.S. Appl. No. 11/740,737, filed Sep. 13, 2010, Office Action.

"Managing Complexity in Middleware," by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pgs. Retrieved from the Internet: http://www.aosd.net/2005/workshops/acp4is/past/acp4is03/papers/colyer.pdf.

"User Interface Declarative Models and Development Environments: A Survey," by Paulo Pinheiro Da Silva, Department of Computer Science, University of Manchester, Manchester, England, [online] [retrieved on Apr. 20, 2007], 20 pgs. Retrieved from the Internet: http://www.cs.utep.edu/paulo/papers/PinheirodaSilva_DSVIS_2000.pdf.

"Architecturing and Configuring Distributed Application with Olan," by R. Balter, L. Bellissard, F. Boyer, M Riveill and J.Y. Vion-Dury, Middleware 98 Conference Report, INRIA, France, [online] [retrieved on Apr. 20, 2007], 15 pgs. Retrieved from the Internet: http://www.comp.lancs.ac.uk/computing/middleware98/papers.html.

"A Load Balancing Module for the Apache Web Server," Author Unknown, [online] [retrieved on Apr. 20, 2007], 9 pgs. Retrieved from the Internet: http://www.backhand.org/ApacheCon2000/US/mod_backhand_coursenotes.pdf.

"Performance Tuning and Optimization of J2ee Applications on the Jboss Platform," by Samuel Kounev, Bjorn Weis and Alejandro Buchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04-cmg-JBoss.pdf.

"Outlier Detection for Fine-Grained Load Balancing in Database Clusters," by Jin Chen, Gokul Soundararajan, Madalin Mihailescu and Cristiana Amza, Department of Computer Science, Department of Electrical and Computer Engineering, University of Toronto, [online] [retrieved on Apr. 20, 2007], 10 pgs. Retrieved from the Internet: http://www.cs.toronto.edu/~jinchen/papers/smdb07.pdf.

* cited by examiner

TUNING AND OPTIMIZING DISTRIBUTED SYSTEMS WITH DECLARATIVE MODELS

CROSS-REFERENCE TO RELATED APPLICATIONS

N/A

BACKGROUND

Background and Relevant Art

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs. In general, distributed application programs comprise components that are executed over several different hardware components, often on different computer systems in a tiered environment.

With distributed application programs, the different computer systems may communicate various processing results to each other over a network. Along these lines, an organization will employ a distributed application server to manage several different distributed application programs over many different computer systems. For example, a user might employ one distributed application server to manage the operations of an ecommerce application program that is executed on one set of different computer systems. The user might also use the distributed application server to manage execution of customer management application programs on the same or even a different set of computer systems.

Of course, each corresponding distributed application managed through the distributed application server can, in turn, have several different modules and components that are executed on still other different computer systems. One can appreciate, therefore, that while this ability to combine processing power through several different computer systems can be an advantage, there are other disadvantages to such a wide distribution of application program modules. For example, organizations might expect a distributed application server to run distributed applications optimally on the available resources, and take into account changing demand patterns and resource availability.

Unfortunately, conventional distributed application servers are typically ill-equipped (or not equipped at all) to automatically handle and manage all of the different problems that can occur for each given module of a distributed application program. For example, a user may have an online store application program that is routinely swamped with orders whenever there is a promotion, or during the same holidays each year. In some cases, the user might expect the distributed application server to analyze and anticipate these fluctuating demands on various components or modules of the given distributed application program.

In particular, the organization might expect the distributed application server to swap around various resources so that high-demand processes can be handled by software and hardware components on other systems that may be less busy. Such accommodations, however, can be difficult if not impossible to do with conventional distributed application server platforms. Specifically, most conventional distributed application server platforms are ill-equipped or otherwise unable to identify and properly manage different demand patterns between components of a distributed application program. This may be due at least partly to the complexity in managing application programs that can have many distributed components and subsystems, many of which are long-running workflows, and/or otherwise legacy or external systems.

In addition, conventional distributed application program servers are generally not configured for efficient scalability. For example, most distributed application servers are configured to manage precise instructions of the given distributed application program, such as precise reference and/or component addressing schemes. That is, there is often little or no "loose coupling" between components of an application program. Thus, when an administrator of the server desires to redeploy certain modules or components onto another server or set of computer systems, there is an enhanced potential of errors particularly where a large number of different computer systems and/or modules may be involved. This potential for errors can be realized when some of the new module or component references are not passed onward everywhere they are needed, or if they are passed onward incorrectly.

One aspect of distributed application programs that can further enhance this potential for error is the notion that the distributed application server may be managing several different distributed application programs, each of which executes on a different platform. That is, the distributed application server may need to translate different instructions for each different platform before the corresponding as distributed application program may be able to accept and implement the change. Due to these and other complications, distributed application programs tend to be fairly sensitive to demand spikes.

This sensitivity to demand spikes can mean that various distributed application program modules may continue to operate at a sub-optimum level for a long period of time before the error can be detected. In some cases, the administrator for the distributed application server may not even take corrective action since attempting to do so could result in an even greater number of errors. As a result, a distributed application program module could potentially become stuck in a pattern of inefficient operation, such as continually rebooting itself, without ever getting corrected during the lifetime of the distributed application program. Accordingly, there are a number of difficulties with management of current distributed application programs and distributed application program servers that can be addressed.

BRIEF SUMMARY

Implementations of the present invention provide systems, methods, and computer program products configured to automatically manage and adjust operations of distributed application programs through a distributed application program server. In at least one implementation, for example, a distributed application program server comprises a set of implementation means and a set of analytics means. Through a platform-specific driver for each given module of a distributed application program, the implementation means deploy sets of high-level instructions, or declarative models, to create a given distributed application program module on the respective platform, while the analytics means automatically monitor and adjust the declarative models, as needed. This loose coupling through the declarative models of server components to the distributed application program and automatic monitoring and adjustment can allow the server to better (e.g., automatically) manage demand, resource, or usage spikes, and/or other forms of distributed application program behavior fluctuations.

Accordingly, at least one method in accordance with an implementation of the present invention can include sending an initial set of instructions corresponding to at least one declarative model of a distributed application program to a platform-specific driver of implementation means. The method can also include receiving one or more event streams through the platform-specific driver. In general, the one or more event streams contain information about execution of the distributed application program. In addition, the method can include correlating the received execution information with the at least one declarative model. Furthermore, the method can include modifying the at least one declarative model in accordance with the received execution information. The modification to the at least one declarative model will adjust one or more operations of the distributed application program.

In addition, another or alternative method in accordance with an implementation of the present invention can include implementing, via implementation means, an initial set of platform-specific instructions for a distributed application program on one or more different computer systems based on one or more declarative models for the distributed application program. The method can also include monitoring behavioral information for one or more modules of the distributed application program at the one or more different computer systems. In addition, the method can include determining from the monitored behavioral information that one or more corresponding operational trends fall outside a desired parameter. Furthermore, the method can include adjusting at least one declarative model to account for the one or more operational trends that fall outside the desired parameter. Still further, the method can include implementing, via the implementation means, a subsequent set of platform-specific instructions for the distributed application program based on the adjusted at least one declarative model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to automatically manage and adjust operations of distributed application programs through a distributed application program server. In at least one implementation, for example, a distributed application program server comprises a set of implementation means and a set of analytics means. Through a platform-specific driver for each given module of a distributed application program, the implementation means deploy sets of high-level instructions, or declarative models, to create a given distributed application program module on the respective platform, while the analytics means automatically monitor and adjust the declarative models, as needed. This loose coupling through the declarative models of server components to the distributed application program and automatic monitoring and adjustment can allow the server to better (e.g., automatically) manage demand, resource, or usage spikes, and/or other forms of distributed application program behavior fluctuations.

Accordingly, and as will be understood more fully from the following specification and claims, implementations of the present invention can provide a number of advantages, effectively through automated, yet high-level management. For example, a user (e.g., server administrator) can create high-level instructions in the form of declarative models, which effectively state various generalized intents regarding one or more operations and/or policies of operation in a distributed application program. These generalized intents of the declarative models can then be implemented through specific commands in various application containers, which, during or after execution, can also be coordinated with various event streams that reflect distributed application program behavior.

In particular, and as will also be discussed more fully herein, these returned event streams can be used in conjunction with the declarative models by analytics means to reason about causes of behavior in the distributed application systems, whereby the analytics means logically joins operational data regarding the real world, and data in the declarative models. The analytics means and implementations means components of the present invention can then use this joined data to plan changes and actions on declarative models based on causes and trends of behavior of distributed systems, and thus automatically adjust distributed application program behavior on an ongoing basis.

Figure 1A:
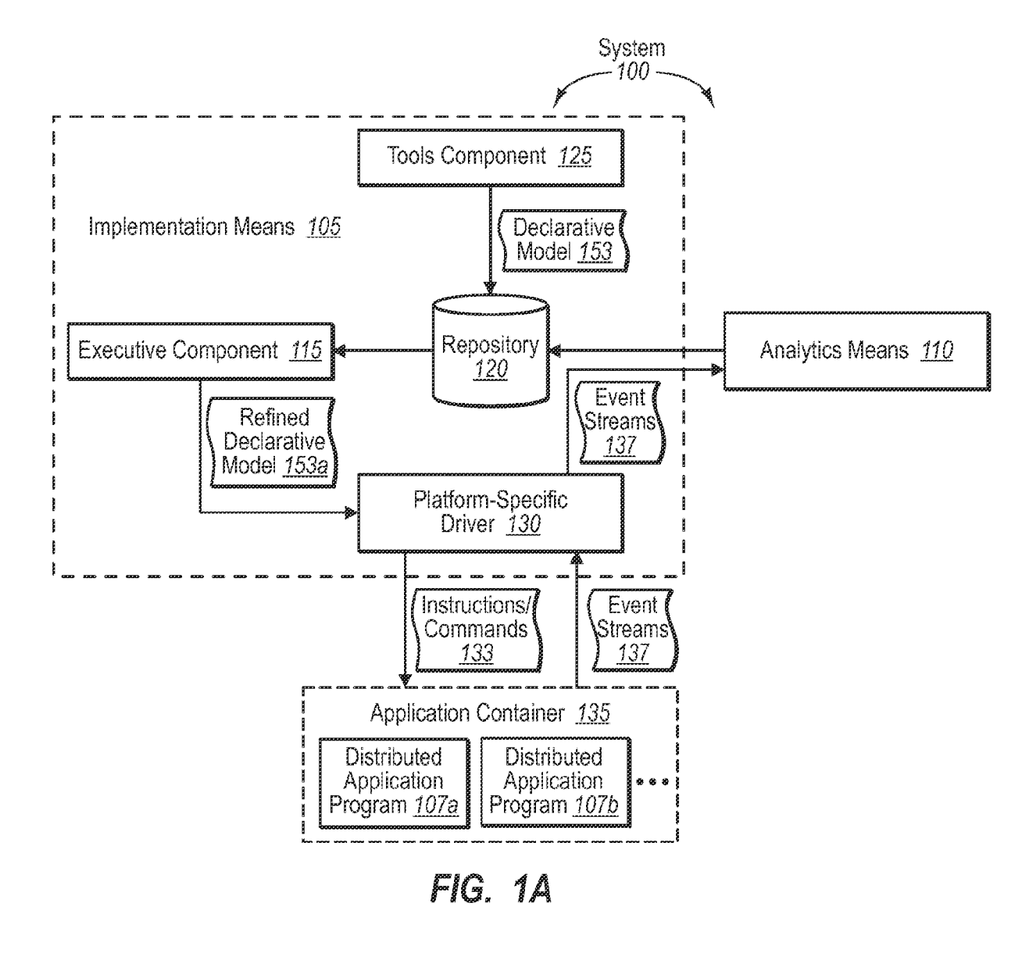
FIG. 1A illustrates an overview schematic diagram in accordance with an implementation of the present invention of a system configured to automatically implement, analyze, and otherwise adjust distributed application program behavior or operations using one or more declarative models.

Referring now to the Figures, FIG. 1A illustrates an overview schematic diagram of at least one implementation of the present invention in which a distributed application server in a distributed computerized environment/system 100 is used to manage one or more different distributed application programs 107 on an ongoing, automatic basis. In particular, FIG. 1A shows a system 100 comprising an implementation means 105 and an analytics means 110. In general, implementation means 105 and analytics means 110 comprise one or more generalized components that can be used within one or more distributed application program servers to manage one or more different distributed application programs 107(a-b, etc.) in one or more application containers 135.

For example, FIG. 1A shows that, in at least one implementation, implementation means 105 can comprise a tools component 125. In general, tools component 125 can be used to create one or more declarative models 153. For example, a user (e.g., distributed application program developer) can use one or more developer's tools (e.g., 125) to create a declarative model 153. As a preliminary matter, one will appreciate that any reference herein to any platform (or otherwise operating system)-specific component or module is made purely by way of convenience in explanation. Specifically, any reference herein to any component, module or feature will be understood as capable of being applied in a wide range of operating environments, systems, and/or applications.

In any event, and as previously mentioned, declarative models 153 include one or more sets of high-level instructions regarding operations of a particular distributed application program 107. These high-level instructions generally describe a particular intent for operation/behavior of one or more modules in the distributed application program, but do not necessarily describe steps required to implement the particular operations/behaviors. For example, a declarative model 153 can include such information as on what computer systems a particular module should run, as well as the characteristics of a computer system that should be allowed to run the particular module (e.g., processing speed, storage capacity, etc.). Although the declarative model 153 could include ultimately such specific information as the Uniform Resource Identifier (URI) address of a particular endpoint, the initial creation of declarative models 153 will more likely include generalized information, such as a domain name where a module can be executed, different permissions sets that can be associated with execution of the module, whether or not certain components should connect at all, etc.

For example, a declarative model 153 may describe the intent of having one web service connect to another web service. When ultimately interpreted and/or translated, these generalized intent instructions can result in very specific instructions/commands, depending on the platform or operating environment. For example, the declarative model 153 could include instructions so that, when interpreted, a web service deployed into one datacenter may be configured to use a TCP transport if one other web service is nearby, and alternatively use an Internet relay connection if the other web service is outside of the firewall (i.e., not nearby).

Although indicating a preference for connection of some sort, the declarative model (e.g., a "declarative application model") (153) will typically leave the choice of connection protocol to a model interpreter. In particular, a declarative model might indicate a preference for connections, while the declarative model interpreter (e.g., executive component 115 and/or platform-specific driver 130) can be configured to select different communication transports for the intended connection depending on where specific modules are deployed. For example, the model interpreter (e.g., executive component 115 and/or platform-specific driver 130) may prepare more specific instructions to differentiate the connection between modules when on the same machine, in a cluster, or connected over the Internet.

Similarly, another declarative model (e.g., a "declarative policy model") (153) may describe operational features based more on end-use policies. For example, a declarative policy model used with a distributed financial application program may dictate that no more than 100 trade requests in a second may be sent over a connection to a brokerage firm. A policy model interpreter (e.g., executive component 115 and/or platform-specific driver 130), however, can be configured to choose an appropriate strategy, such as queuing excessive requests to implement the described intent.

In any case, FIG. 1A shows that, upon creating a particular declarative model 153, the tools component 125 then passes (e.g., writes) the declarative model 153 into repository 120. In at least one implementation, any time repository 120 receives any kind of modification to a declarative model 153 (e.g., new writes, or modifications from analytics means 110), the repository 120 can send one or more updates or alerts to the executive component 115. In additional or alternative implementations, however, executive component 115 may be configured to identify any such modifications, creations, or changes by synchronizing with repository 120 on some particular schedule.

In either case, executive component 115 ultimately identifies, receives and refines the declarative models 153 (and/or changes thereto) in repository 120 so that they can be translated by the platform-specific driver 130. In general, "refining" a declarative model 153 includes adding or modifying any of the information contained in a declarative model so that the declarative model instructions are sufficiently complete for translation by platform-specific driver 130. Since the declarative models 153 can be written relatively loosely by a human user (i.e., containing generalized intent instructions or requests), there may be different degrees or extents to which an executive component will need to modify or supplement a declarative model.

In one implementation, for example, executive component 115 refines the declarative model 153 using a progressive elaboration techniques, until there are no ambiguities, and details are sufficient for the platform-specific drivers 130 to consume them. Along these lines, for example, the executive component 115 can be configured to refine the declarative model 153 based knowledge of semantics of dependencies between elements in the declarative model 153 (e.g. one web service connected to another). In additional or alternative implementations, the executive component 115 can also be configured to refine the declarative model 153 for some other contextual awareness, such as the information about the inventory of application containers 135 that may be available in the datacenter where a distributed application program will be deployed.

In addition, the executive component 115 can be configured to fill in missing data regarding computer system assignments. For example, executive component 115 might identify a number of different modules in a declarative model 153 that have no requirement for specific computer system addresses or operating requirements. The executive component 115 might thus assign distributed application program modules to available computer systems arranged by appropriate distributed application program containers 135. The executive component 115 may then record that machine information in the refined declarative model 153a (or segment thereof). Along these lines, the executive component 115 can reason about the best way to fill in data in a refined declarative model 153. For example, as previously described, executive component 115 may determine and decide which transport to use for an endpoint based on proximity of connection, or determine and decide how to allocate distributed application program modules based on factors appropriate for handling expected spikes in demand.

In addition or alternative implementations, the executive component 115 can be configured to compute dependent data in the declarative model 153. For example, the executive component 115 may compute dependent data based on an assignment of distributed application program modules to machines. Along these lines, the executive component 115 may calculate URI addresses on the endpoints, and propagate the corresponding URI addresses from provider endpoints to consumer endpoints. In addition, the executive component 115 may evaluate constraints in the declarative model 153. For example, the executive component 115 can be configured to check to see if two distributed application program modules can actually be assigned to the same machine, and if not, the executive component 115 can refine the declarative model 153*a* to accommodate this requirement.

After adding all appropriate data (or otherwise modifing/refining) the given declarative model 153 (to create model 153*a*), the executive component 115 can finalize the refined declarative model 153*a* so that it can be translated by platform-specific drivers 130. To finalize or complete the refined declarative model 153*a*, executive component 115 might, for example, partition declarative model 153 into segments that can be targeted by any one or more platform-specific drivers 130. To this end, the executive component 115 might tag each declarative model 153*a* (or segment thereof) with its target driver (e.g., the address of platform-specific driver 130). Furthermore, the executive component 115 can verify that the declarative model 153*a* can actually be translated by the platform-specific drivers 130, and, if so, pass the refined declarative model 153*a* (or segment thereof) to the particular platform-specific driver 130 for translation.

In any case, FIG. 1A shows that the platform-specific driver 130 translates these instructions corresponding to the refined declarative models 153*a* (and/or segment thereof) into sets of one or more platform-specific instructions/commands 133. For example, FIG. 1A shows that the platform-specific driver 130 might create a set of imperative instructions/commands 133 that can be executed in a particular operating system or operating environment, and/or will be understood by a specific application program operating in a particular application container 135. As a result, the generalized or supplemented instructions placed into the declarative models by the tools component 125 and/or executive component 115 ultimately direct operational reality of an application in one or more application containers 135.

In particular, the distributed application containers 135 execute the declarative models 153 by executing the instructions/commands 133 received from the platform-specific driver 130. To this end, the distributed application containers 135 might replace or update any prior modules that have been replaced or revised with a new declarative model 153. In addition, the distributed application containers 135 execute the distributed application modules and/or components described in the new instructions/commands 133, as appropriate, on any number of different computer systems.

In addition, the distributed application programs 107 provide various operational information about execution and performance back through the implementation means 105. For example, the distributed application program 107 may send back one or more event streams 137 regarding various execution or performance issues. In one implementation, the distributed application program 107 may send out the event streams 137 on a continuous, ongoing basis, while, in other implementations, the distributed application program 107 sends the event streams on a scheduled basis (e.g., based on a schedule setup by the platform-specific driver 130). The platform-specific drivers 130, in turn, pass the one or more event streams 137 to analytics means 10 for analysis, tuning, and/or other appropriate modifications.

In particular, and as will be understood more fully herein, the analytics means 110 aggregate, correlate, and otherwise filter the relevant data to identify interesting trends and behaviors of the various distributed application programs 107. The analytics means 110 can also modify corresponding declarative models 153 as appropriate for the identified trends. For example, the analytics means 10 may modify declarative models 153 so that a given module of a distributed application program can be redeployed on another machine if the currently assigned machine is rebooting too frequently.

Figure 1B:
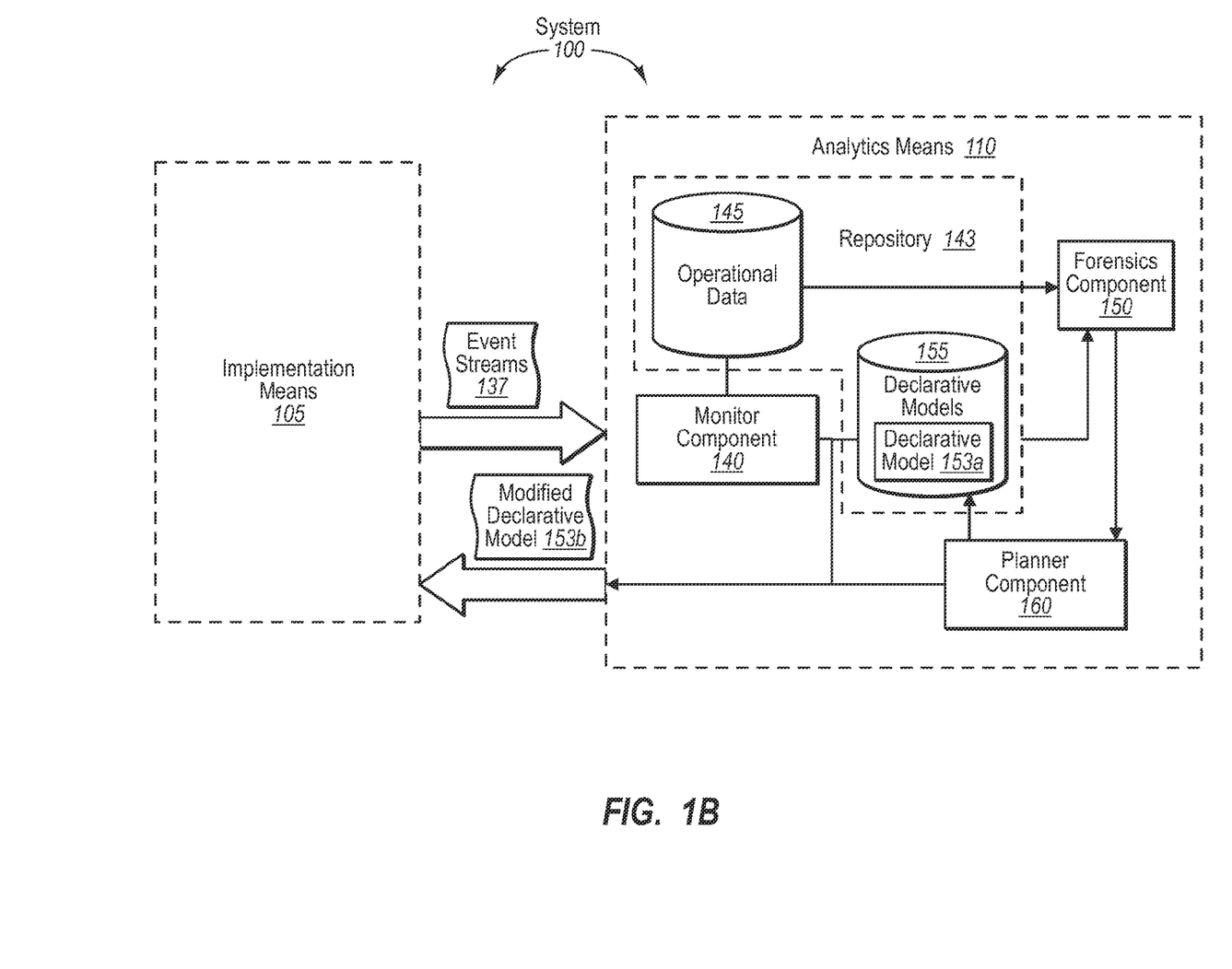
FIG. 1B illustrates a more detailed schematic diagram of the analytics means component shown in FIG. 1A.

Accordingly, FIG. 1B illustrates a more detailed view of the analytics means 110 and the corresponding components therein. For example, FIG. 1B shows that analytics means 115 can comprise at least a monitoring component 140, as well as a general repository 143, which includes a repository 145 for hosting/storing operational data, as well as repository 155 for storing declarative models (e.g., 153/153*a*). In one implementation, repository 143 (or any sub-repository 145, 155 therein) is the same physical media and/or storage partition as repository 120. Nevertheless, FIGS. 1A and 1B illustrate these repositories as different information stores for purposes of illustrating at least one implementation.

As previously described, analytics means 110 can receive one or more event streams 137 from implementation means 105 (e.g., from platform-specific drivers 130). As shown in FIG. 1B, analytics means 110 receives these event streams 137 through monitoring component 140, which normalizes the received event streams 137, and computes operational data in repository 145. In general, operational data in repository 145 includes data about the distributed application programs 107 during execution, including any operational information regarding execution of virtually any module or component of the distributed application program on a particular computer system, as well as the corresponding behavior of such. For example, monitoring component 140 might identify the number of requests served per hour, the average response times, and so forth in a web service distributed application program.

To create useful information, monitoring component 140 computes the operational data (in repository 145) by comparison of the event streams with the corresponding declarative models 153. In at least one implementation, monitoring component 140 performs join-like filtering of event streams that include real world events with intent information described by a particular declarative model 153. As such, the operational data in repository 145 will typically include primarily data that are relevant and aggregated to the level of describing the running distributed application program 107 (and corresponding modules) and systems around it.

In addition to the foregoing, FIG. 1B shows that analytics means 110 comprises a forensics component 150, which can receive the operational data created by monitoring component 140. In at least one implementation, forensics component 150 comprises an expert system that can detect patterns in the operational data of repository 145. At least part of being an expert system in this particular example is that the forensics component 150 knows what questions to ask against the prepared operational data. Prior to querying the operational data, however, the forensics component 150 will generally perform one or more additional join operations to join the operational data in repository 145 with declarative model 153 data in repository 155. Thereafter, the forensics component 150 will further perform the appropriate queries. Accordingly, the query results obtained by the forensics component 150 represent the intersection of the declarative model 153 information and real-world operational information from distributed application program behavior.

Such information identified by the forensics component 150 can thus include trends, pathologies (and their causes) and other behavior of running/executing distributed application programs 107. The forensics component 150 can also identify these trends, pathologies, etc. in the corresponding platforms/operating environments/application containers 135 in which the distributed application programs 107 are running. This allows the forensics component 150 to identify such information as acceleration in the rate of reboots of a particular server, and/or that such reboots may be caused by a memory leak after a recent application change.

Upon identifying these various trends and reports, FIG. 1B shows that the forensics component 150 passes this information to planner component 160. In general, planner component 160 is an associative expert system that decides how to change declarative models 153 based on behavioral, trend-based, or otherwise environmental actions and/or causes (e.g., received from forensics component 150). For example, the planner component 160 may decide upon review of the information received from forensics component 150 to roll back a recent change (e.g., that caused a particular server to reboot very frequently) to a recent distributed application program 107.

In order to make determinations about whether or to what extent to modify a distributed application program's behavior, the planner component 160 can employ any number of tools. For example, the planner component 160 may apply statistical inferencing and constraint-based optimization techniques. The planner component 160 may also compare potential decisions on a declarative model (e.g., a possible update thereto) to prior decisions made for a declarative model (e.g., a previous update thereto), and measure success rates continuously over time against a Bayesian distribution. Thus, the planner component 160 more-directly influences operations in a distributed application program 107 at least in part by creating or changing corresponding declarative models 153.

In one example of operation, therefore, planner component 160 can identify from forensics component 150 that multiple modules on a particular computer system are having to restart or reboot frequently. Planner component 160 might thus update declarative model 153a (to create model 153b) to change the physical location of the corresponding modules to a more stable computer system. If that did not work, then the planner component 160 could perform still further actions, such as by changing the declarative model 153a again to specify operating policies. For example, the planner component 160 might determine a policy update in the declarative model 153a so that, during a specific time of day, month, or year, a particular module can only perform requests for some predetermined maximum number of users. The planner component 160 might further update another refined declarative model 153a (to create modified declarative model 153b) to better handle failover requests during this same time period using additional computer systems.

Planner component 160 can then pass these and any other changes in the declarative models 153 (i.e., modified declarative model 153b) to implementation means 105, such as by sending these modified declarative models directly to executive component 115, or simply by updating repository 120 with the relevant changes. As previously mentioned, if the change is stored in repository 120 (rather than sent directly to executive component 115), executive component 115 will ultimately identify the change, whether through a continuous or periodic synchronizing mechanism. The executive component 115 can then begin the previously described processes of refining the declarative model so that it is suitable for translation. Upon refining the modified/updated declarative model, the platform-specific driver 130 can translate the refined, modified declarative model into a set of commands, which have effects on the appropriate distributed application containers.

Accordingly, FIGS. 1A and 1B illustrate (and the corresponding text) illustrate or otherwise describe a number of different components, modules, and mechanisms for reasoning and modifying deeply schematized data, which has effects on actual operations. In particular, FIGS. 1A and 1B (and the corresponding text) illustrate or otherwise describe a number of components, modules, and mechanisms that can be used to automatically manage, adjust, and tune operations of distributed application programs during execution. These component, modules, and mechanisms can provide a powerful framework for applying the principle of system adaptability and autonomics.

Figure 2:
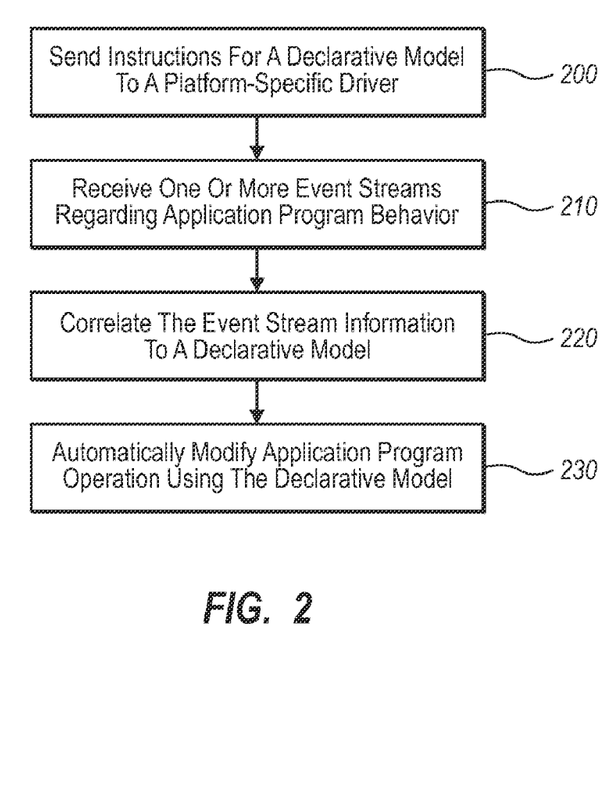
FIG. 2 illustrates a flowchart in accordance with an implementation of the present invention of a series of acts in a method of automatically monitoring and adjusting one or more declarative models of a distributed application program during execution.
Figure 3:
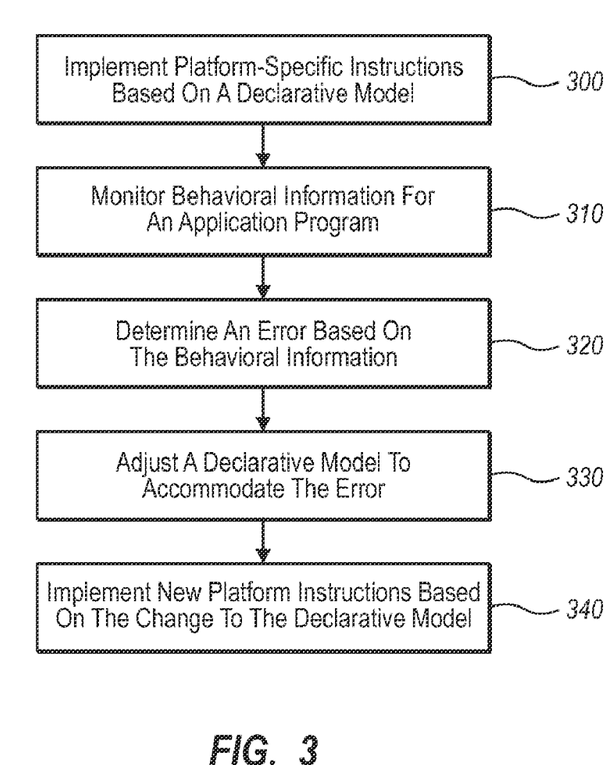
FIG. 3 illustrates a flowchart in accordance with an implementation of the present invention of a series of acts in a method of automatically adjusting operations of a distributed application program through periodic monitoring and tuning of one or more declarative models.

Implementations of the present invention can also be described in terms of one or more flowcharts comprising acts and/or steps in a method for accomplishing a particular result. For example, FIG. 2 and FIG. 3 illustrate flowcharts comprising a series of acts and/or steps from the perspective of a server for automatically monitoring and tuning distributed application program behaviors using a declarative model, or sets of high-level instructions. The acts and/or steps of FIGS. 2 and 3 are described below in terms of the components, modules, schematics, and corresponding text of FIGS. 1A and 1B.

For example, FIG. 2 shows that the method from the perspective of a server of automatically monitoring and adjusting one or more declarative models of a distributed application program can comprise an act 200 of sending instructions for a declarative model to a platform-specific driver. Act 200 includes implementing, via implementation means, an initial set of platform-specific instructions for distributing an application program in one or more different computer systems, based on one or more declarative models for the distributed application program. For example, FIGS. 1A and 1B show that implementation means 105, which comprises tools component 125, executive component 115, repository 120, and platform-specific driver 130, can generate and implement any number of high-level instructions (e.g., declarative models 153) as specific, low-level commands through an application container 135.

FIG. 2 also shows that the method from the perspective of the server can comprise an act 210 of receiving one or more event streams regarding application program behavior. Act 210 includes receiving one or more event streams through the platform-specific driver, the one or more event streams containing execution information about the distributed application program. For example, FIGS. 1A and 1B show that the application container 135 passes one or more event streams 135 comprising operational data for the distributed application program back to the platform-specific driver 130. As previously described, the platform-specific driver 130 passes these event streams 135 onward to the analytics means 110.

Accordingly, FIG. 2 shows that the method from the perspective of the server can comprise an act 220 of correlating the event stream information to a declarative model. Act 220 includes correlating the received execution information with at least one declarative model. For example, the monitoring component 140 of analytics means 110 can correlate the execution information received in the event streams 137 with declarative model data in repository 155, and thereby create operational data in repository 145.

In addition, FIG. 2 shows that the method from the perspective of the server can comprise an act 230 of automatically modifying the application program operations using the declarative models. Act 230 includes modifying the at least one declarative model in accordance with the received execution information, wherein the modification to the at least one declarative model adjusts one or more operations of the distributed application program. For example, FIG. 1B shows that the forensics as component 150 and planner component 160 can exchange information to identify specific behaviors in the distributed application programs that may or may not be working as intended (based on instructions from the declarative models 153). The planner component 160 can then adjust those corresponding declarative models appropriately. Ultimately, the implementation means 105 implements any such changes to the declarative models via the refinement and translation processes described above.

In addition to the foregoing, FIG. 3 shows that an additional or alternative method in accordance with the present invention from the perspective of the server of automatically adjusting operations of a distributed application with declarative models can comprise an act 300 of implementing platform-specific instructions based on a declarative model. Act 300 includes implementing, via implementation means, an initial set of platform-specific instructions for a distributed application program on one or more different computer systems, based on one or more declarative models for the distributed application program. For example, as previously described, the implementations means 105 can comprise one or more components for generating and distributing instructions corresponding to one or more declarative models down through a platform-specific driver 130, which then passes specific instructions/commands 133 to one or more application containers 135.

FIG. 3 also shows the method from the perspective of the server can comprise an act 310 of monitoring behavioral information for an application program. Act 310 includes monitoring behavioral information for one or more modules of the distributed application program at the one or more different computer systems. For example, FIGS. 1A and 1B show that application container 135 passes event streams back to implementation means 105 through the platform-specific driver 130, which then passes these event streams 135 on to the analytics means 110, where they are received and normalized at a monitoring component 140.

In addition, FIG. 3 shows that the method from the perspective of the server can comprise an act 320 of determining an error based on the monitored behavioral information. Act 320 includes determining from the monitored behavioral information that one or more corresponding operational trends fall outside of an expected or desired parameter. For example, FIG. 1B shows the monitoring component 140 and forensics component 150 can generate and analyze operational data in repository 145 to determine if one or more modules are rebooting too frequently or acting in some other way that falls outside of a desired or preferred parameter.

Furthermore, FIG. 3 shows that the method from the perspective of the server can comprise an act 330 of adjusting a declarative model to accommodate the error. Act 330 includes adjusting at least one declarative model to account for the one or more operational trends that fall outside the desired parameter. For example, FIG. 1B shows that the planner component 160 can receive information from the forensics component 150 and then, based on its own additional analysis, adjust or otherwise modify one or more declarative models 153 in repository 155.

Still further, FIG. 3 shows that the method from the perspective of the server can comprise an act 340 of implementing new platform-specific instructions based on the change to the declarative model. Act 340 includes implementing, via implementation means, a subsequent set of platform-specific instructions for the distributed application container based on the adjusted as least one declarative model. For example, FIG. 1B shows that planner component 160 passes along a modified declarative model 153*b* to the implementation means 105. Upon an appropriate trigger, such as receipt into repository 120, the executive component 115 can then generate a new set of refinements, if necessary, to the modified declarative model 153*b*; and platform-specific driver 130 can translate the refined, modified declarative model 153*b* for implementation in the application containers.

Accordingly, FIGS. 1A through 3 provide a number of different schematics, components, and mechanisms for automatically monitoring and adjusting complicated behavior in distributed application programs using high-level overview instructions. One will appreciate that this ability to manage and adjust operational details using primarily high-level instructions (declarative models) allows for a great deal of scaling and loose coupling between server and application functions. This can also provide a great deal of flexibility and usability of distributed application programs, and can allow system administrators to more easily (and more adequately) monitor and account for different resources and distributed application program/system behaviors.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a server configured in a computerized environment to manage one or more distributed application programs through one or more platform-specific drivers, a method of automatically monitoring and adjusting behaviors of a distributed application program through management of one or more declarative models, whereby the distributed application program automatically responds to fluctuations in hardware performance or user demand, comprising the acts of:
at a server system that includes implementation means:
sending an initial set of instructions corresponding to at least one declarative model of a distributed application program to at least one platform-specific driver of the implementation means, the at least one declarative model describing intent for operation of one or more modules of the distributed application program, and the at least one platform-specific driver providing instructions for executing the one or more modules as part of the distributed application program;
after initiation of execution of the distributed application program, receiving one or more event streams through the at least one platform-specific driver, the one or more event streams received through the at least one platform-specific driver containing information about real-time performance of the distributed application program during execution of the distributed application program within the computerized environment;
correlating the received execution information about performance of the distributed application program with the at least one declarative model, including the described operation of the one or more modules of the distributed application program; and
modifying the at least one declarative model in accordance with the received execution information, wherein the modification to the at least one declarative model adjusts one or more intended operations of one or more modules of the distributed application program.

2. The method as recited in claim 1, wherein the one or more event streams are received in response to a query that is scheduled to occur periodically.

3. The method as recited in claim 1, further comprising an act of a monitoring component creating operational data from the received one or more event streams, wherein the operational data includes behavior information metrics about execution of the distributed application program.

4. The method as recited in claim 3, wherein the act of creating operational data further comprises joining data of at least one of the one or more event streams with data in an declarative model repository.

5. The method as recited in claim 3, further comprising an act of a forensics component querying the operational data with one or more queries to identify one or more operational trends of the distributed application program.

6. The method as recited in claim 5, wherein at least one of the one or more queries includes one or more identifiers of a module in the distributed application program.

7. The method as recited in claim 5, wherein the one or more operational trends include an indication that one or more hardware components on which the distributed application program is executing are operating incorrectly or are failing.

8. The method as recited in claim 5, wherein the one or more operational trends include an indication that one or more software modules of the distributed application program are executing incorrectly or are failing.

9. The method as recited in claim 5, wherein the one or more operational trends include an indication of a frequency with which a machine that is executing at least a portion of the distributed application program is rebooting or otherwise restarting.

10. The method as recited in claim 5, further comprising an act of a planner component receiving the one or more operational trends from the forensics component.

11. The method as recited in claim 10, further comprising an act of the planner component correlating the one or more operational trends received from the forensics component with data of the at least one declarative model.

12. The method as recited in claim 11, wherein the act of modifying the at least one declarative model in accordance with the received execution information further comprises an act of the planner component modifying the at least one declarative model to create a modified declarative model.

13. The method as recited in claim 12, wherein the modified declarative model identifies a different set of one or more hardware components on which at least a portion of the distributed application program should be executed.

14. The method as recited in claim 12, wherein the modified declarative model reflects a change in execution or use policy for at least a portion of the distributed application program.

15. The method as recited in claim 12, further comprising an act of sending the modified declarative model to the implementation means, wherein information of the modified declarative model can be processed through the platform-specific driver.

16. The method as recited in claim 15, further comprising an act of the implementation means sending a subsequent set of instructions corresponding to the modified declarative model to the platform-specific driver.

17. At a server configured in a computerized environment to manage operations of one or more distributed application programs through one or more platform-specific drivers using one or more declarative models, a method of automatically adjusting operations of a distributed application program through periodic monitoring and tuning of the one or more declarative models during execution of the distributed application program, comprising:
at a server system comprising implementation means and analytics means:
implementing, via implementation means, an initial set of platform-specific instructions for a distributed application container on one or more different computer systems based on one or more declarative models for the distributed application program, the one or more declarative models describing behavior of one or more modules of the distributed application program, without describing how to implement such behavior of the one or more modules, the one or more declarative models loosely coupling components of an application system, and the one or more declarative models specifying at least a domain name where a module can be executed, and a plurality of permission sets that can be associated with execution of a module;

initiating execution of the distributed application program using the one or more modules, wherein initiating execution of the distributed application program includes using a connection protocol based on proximity of two or more modules, which connection protocol is not specified by the one or more declarative models;

after initiating execution of the distributed application program, monitoring real-time behavioral information for the one or more modules of the distributed application program at the one or more different computer systems, wherein monitoring real-time behavioral information is through one or more event streams received through at least one platform-specific driver;

determining from the monitored real-time behavioral information that one or more corresponding operational trends fall outside a desired parameter, including at least one operational trend indicating that a computer system on which at least one of the one or more modules is installed is rebooting too frequently;

automatically adjusting at least one declarative model to account for the computer system on which at least one of the one or more modules is installed rebooting too frequently; and implementing, via the implementation means, a subsequent set of platform-specific instructions for the distributed application container based on the adjusted at least one declarative model.

18. The method as recited in claim 17, wherein the one or more operational trends that fall outside the desired parameter further indicate at least:

that at least a module of the distributed application program is failing too frequently.

19. The method as recited in claim 17, wherein the one or more operational trends that fall outside the desired parameter correspond to a usage spike and further indicate that at least one of the one or more modules is receiving a number of processing requests during a specified time interval that exceeds a parameter specified in the one or more declarative models.

20. At a server configured in a computerized environment to manage one or more distributed application programs through one or more platform-specific drivers, a computer program storage product having computer-executable instructions stored thereon that, when executed, cause one or more processors in the server to perform a method comprising the acts of:

sending an initial set of instructions corresponding to at least one declarative model of a distributed application program to at least one platform-specific driver of implementation means, the at least one declarative model describing intent for operation of one or more modules of the distributed application program, and the at least one platform-specific driver providing instructions for executing the one or more modules as part of the distributed application program;

after initiation of execution of the distributed application program, receiving one or more event streams through the at least one platform-specific driver, the one or more event streams received through the at least one platform-specific driver containing information about real-time performance of the distributed application program during execution of the distributed application program within the computerized environment;

correlating the received execution information about performance of the distributed application program with the at least one declarative model, including the described operation of the one or more modules of the distributed application program; and modifying the at least one declarative model in accordance with the received execution information, wherein the modification to the at least one declarative model adjusts one or more intended operations of one or more modules of the distributed application program.

* * * * *